Oct. 1, 1940.                  D. ROBERTS                    2,216,136
GAS IMPREGNATION FOR EXPANDED RUBBER
Filed Dec. 24, 1936
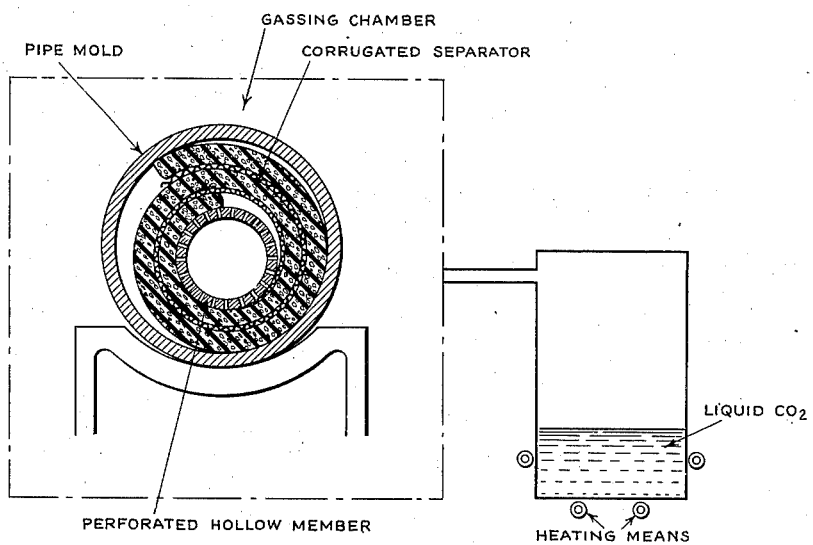
INVENTOR.
Dudley Roberts
BY
Samuel Ostrolenk
ATTORNEY.

Patented Oct. 1, 1940

2,216,136

UNITED STATES PATENT OFFICE 2,216,136

GAS IMPREGNATION FOR EXPANDED RUBBER

Dudley Roberts, New York, N. Y., assignor to Rubatex Products, Inc., New York, N. Y., a corporation of Delaware Application December 24, 1936, Serial No. 117,559

16 Claims. (Cl. 18—53)

This invention relates to novel methods of manufacturing gas-expanded rubber products.

It is among the objects of my present invention to simplify the manufacturing stages in the production of gas-expanded rubber products and accordingly reduce the production time and expense involved.

In prior processes for manufacturing gas-expanded rubber as exemplified by U. S. Patent No. 1,905,269 to Denton and application Serial No. 717,550, filed March 27, 1934, of which I am a coinventor, the conventional gassing technique employed an autoclave. The autoclave is a high pressure vessel into which a charge of rubber dough is placed and subjected to a gaseous atmosphere at pressures of the order of 2000 to 3000 pounds per square inch. The rubber charge is generally partially vulcanized by heating during the gassing thereof to facilitate homogeneous gas impregnation and for retaining the individual gas cellular structure upon removal from the gassing chamber.

The heated gassed rubber dough is in a plastic state and would expand to the extent of rupturing the gas cells if the gaseous pressure were materially reduced. Accordingly, the gassed rubber charge is cooled, generally to about 60° F. before reducing the gaseous pressure in the autoclave and removal of the charge to atmospheric conditions. The prior method for cooling the gassed charge was to circulate cold water through the steam coils lining the autoclave chamber, a procedure which required at least one and one-half to two hours before cooling the dough. Considering the expensive equipment tied up during this cooling period, the economy of shortening the gassing cycle is apparent since the production capacity of the autoclave would be correspondingly increased.

In accordance with my present invention, I contemplate reducing the gaseous pressure within the autoclave by a predetermined amount and injecting a cold liquid preferably water into the chamber against the gaseous pressure for directly cooling the dough in a relatively very short period.

The gas generator together with the compressor associated with the autoclave are relatively delicate structures which have a high maintenance cost due to the high pressure involved. A recent attempt to overcome the expense of the pressure generator involves the use of a gas in a solid or liquid form placed in the autoclave at the time of charging and subsequently heating the condensed gas to produce the requisite high pressure within the chamber. Such a procedure is outlined in the co-pending application Serial No. 21,380, filed May 14, 1935, assigned to the same company as this invention, and of which I am a co-inventor.

I have discovered that the condensed gaseous materials are most efficiently utilized in generating the autoclave pressures by introducing them to an auxiliary container to which heat is applied for vaporizing the condensed gases. The pressures generated in the auxiliary vaporizer are introduced to the autoclave through a pipe line in the conventional manner. A material reduction in equipment investment is accordingly effected. Suitable condensed gases which are commercially available in large quantities are carbon dioxide or sulphur dioxide in solid or liquid form.

An important factor in the gassing of the rubber dough is to uniformly heat the dough and homogeneously gas impregnate it to produce a product of uniform quality and having predetermined characteristics. When the rubber is gassed in the form of individual sheets, either rolled over a central mandrel or stacked, I have found that by placing corrugated or fluted paper between the sheets, the heating and gassing of the rubber sheets is performed more uniformly. If a cylinder of rubber is required, as for example in the manufacture of long rubber sheets as disclosed in my co-pending application Serial No. 71,238, filed March 27, 1936, a perforated cylindrical core may be used for the charge to convey the heat and gas to the internal portion of the rubber cylinder.

It is accordingly another object of my present invention to provide a novel method for generating high gaseous pressures within the autoclave for manufacturing gas-expanded rubber products by eliminating compressor equipment.

A further object of my present invention is to provide a novel method for cooling the gassed rubber dough within the autoclave in the manufacture of gas-expanded rubber products.

Still another object of my present invention is to provide a novel method for insuring homogeneous gassing and heating of the rubber sheets in the manufacture of gas-expanded rubber products.

Still a further object of my present invention is to provide a novel method for manufacturing a cylinder of gas-expanded rubber material.

The drawing shows a diagrammatic representation of my invention. Sheets of rubber are shown wound about a perforated hollow member with a corrugated separator between the different layers. The so wound rubber is placed within a pipe mold and subjected to gas in a gassing chamber. The gas is generated by heating liquid carbon dioxide.

My present invention is not limited to the specific composition of the rubber dough employed. Mixtures compounded and milled as described in the Denton patent and the application Serial No. 717,550 referred to hereinabove, may be used with my present invention. In manufacturing rubber sheets, the plastic dough is calendered in sheet form and stacked with corrugated or fluted paper sheeting separating each layer to provide direct access for the gas and heat from opposite surfaces of each individual rubber sheet. The stacked sheets are then either rolled about a central mandrel or are maintained flat in a corresponding container. A long continuous sheet of dough may be gassed by rolling it on the central mandrel with the corrugated sheeting interlaced to maintain the surfaces of the dough spaced for homogeneous gassing and vulcanizing.

In preparing a rubber cylinder, the milled rubber is calendered and built up on a perforated metal cylinder or pipe to a suitable thickness to permit thorough gas impregnation and heating from opposite surfaces. A layer of dough three inches thick formed on the perforated cylinder having a diameter dependent upon the size of the autoclave, will produce a gas expanded cylinder having a thickness of the order of four times that of the original plastic dough, in the present instance, it would expand to a thickness of one foot.

The metal core of the dough cylinder is perforated with innumerable perforations to allow free passage of gas through the holes to the dough. In accordance with my invention, I place the dough cylinder with the central perforated core into a steel shell or pipe of a diameter equal to the final diameter to which the rubber cylinder is to be expanded. The concentric metallic pipes may be made as long as the interior of the autoclave can admit. The end portions between the concentric pipes are enclosed with circular metal cover plates to prevent the dough from expanding beyond the predetermined length for the cylinder. In accordance with my novel procedure, the rubber cylinder is fully expanded between the concentric pipes which act as a mold and also permit free access for the gas and heat of the autoclave to the rubber dough.

A neutral gas such as nitrogen or carbon dioxide is introduced to the autoclave at a pressure of the order of 2000 to 3000 pounds per square inch for gassing the dough contained therein. The temperature of the autoclave is raised to partially vulcanize the dough during gassing in accordance with well known practice. However, the dough may be pre-heated or semi-cured before insertion into the autoclave to render it plastic and highly gas permeable so that the gassing stage may be carried on without the external heating. The advantages and procedure for the pre-curing process before gassing is disclosed in application Serial No. 97,418, filed August 28, 1936, and assigned to the same company as the present invention.

The gas pressure may be generated within the autoclave by conventional means which includes a compressor, but I prefer to simplify the procedure by employing gas in a condensed state, preferably liquid form, to generate the neutral gas. Gases commercially available in large quantities in liquid form which are suitable for the process are carbon dioxide and sulphur dioxide. Although solid forms of the gas may be used, the liquid forms are preferable since they cost less. As described in the aforementioned application Serial No. 21,380, the liquid form of the gas may be directly introduced to the gassing chamber and the gaseous pressure is generated within the autoclave by heating the structure. The heating simultaneously raises the gaseous pressure of the sealed autoclave and partially vulcanizes the dough. However, when the rubber charge is pre-heated to plasticize it for gassing, it is not necessary to heat the gassing chamber for the vulcanization. Accordingly, I provide a vaporizer or auxiliary gassing chamber which is arranged to be heated and into which the liquid form of the gas is introduced by a pipe line from the commercial cylinders in which it is obtained. After introducing the liquid, although the solid form may instead be used, in the auxiliary gassing chamber, it is sealed and heated to convert the liquid carbon dioxide or sulphur dioxide or mixture of carbon dioxide and sulphur dioxide into the gaseous state. Another pipe line is used to convey the generated gases into the gassing chamber or autoclave for gas impregnating the rubber charge therein. By using a sufficient quantity of the condensed form of the gas and using suitable vaporizing temperature in the auxiliary chamber, any predetermined gaseous pressure may be produced in the autoclave avoiding the conventional pressure equipment.

The gassed rubber dough is in a pliable and plastic state which, if removed from the autoclave in heated condition, would be destroyed by rupturing of the individual gas cellular structure. Accordingly, it is necessary to cool the gassed dough to reduce the bursting effect of the heated gas cells and leakage of gas from the charge held in balance by the high pressure in the autoclave. In accordance with my present invention, I reduce the gaseous pressure in the autoclave, permitting a partial expansion of the gassed dough and then inject cold water into the autoclave for direct or contact cooling of the charge contained therein. The rubber dough is accordingly still confined in the autoclave at a high pressure, for example, 700 pounds per square inch to prevent its destructive expansion and leakage and is cooled by the cold liquid, preferably water, in contact with the dough. When the rubber mass has cooled down somewhat, the cold water is then started circulating through the gassing chamber to increase the cooling effect upon the dough, which, in a relatively short time, is rendered sufficiently cold to safely be removed from the autoclave.

The pressure to which the gas is reduced before introducing the cold liquid for cooling, depends upon the characteristics and volume of the rubber charge and the type of container in which the charge is held. The time between introduction of the water under pressure and its subsequent circulation depends upon the bulk of the dough and the temperature to which it was originally raised. The cooling procedure should preferably be carried on so as to attain substantially uniform cooling gradients by designing the intervals of water introduction and the rate of circulation thereof in accordance with the particular type and bulk of dough on hand. By utilizing a direct contact between the cold liquid with the rubber charge, the cooling period is reduced at least one and a half hours over convexion cooling heretofore employed. The gassed rubber cylinder contained between the concentric pipes as a mold will expand to fill this mold before removal from the autoclave in a cooled, partially vulcanized condition. However, the final vulcanization of the rubber charge which is contained in the mold may be carried on inside the autoclave but preferably is carried on in less expensive heating equipment, as is well known in the art. The gassed rubber cylinder may be removed from the autoclave in a heated condition and immediately thereafter plunged into a cold water bath for cooling it since the containing mold will exert suitable pressures for counteracting the pressures generated by the hot gas cells in the rubber.

I claim:

1. The method of manufacturing a cylinder of gas expanded rubber which comprises building up a layer of plastic rubber dough on a perforated hollow member, heating the dough and subjecting it to externally applied neutral gas under pressure in a gassing chamber, to gas impregnate the rubber, said gas penetrating through the hollow supporting medium to gas the inner surface of the rubber, reducing the gaseous pressure, injecting cold water into the chamber against the reduced gas pressure to rapidly cool the heated gassed dough by direct contact with said gassed dough, releasing the gaseous pressure, and finally vulcanizing the dough.

2. The method of manufacturing a cylinder of gas expanded rubber which comprises building up a layer of plastic rubber dough on a perforated hollow member, heating the dough and subjecting it to externally applied neutral gas under pressure in a gassing chamber, to gas impregnate the rubber, said gas penetrating through the hollow supporting medium to gas the inner surface of the rubber, reducing the gaseous pressure, injecting cold water into the chamber against the reduced gas pressure to partially cool the heated gassed dough by direct contact with said gassed dough, and then circulating cold water through the chamber to directly and completely cool the dough, releasing the gaseous pressure, and finally vulcanizing the dough.

3. The method of manufacturing a cylinder of gas expanded rubber which comprises building up a layer of plastic rubber dough on a perforated pipe, enclosing the dough within a larger concentric pipe to serve as a mold, heating the dough and subjecting it to a neutral gas at high pressure, releasing the gaseous pressure permitting the gassed dough to fill the space between the pipes, plunging the dough cylinder into cold water to rapidly cool the dough by direct contact with said cold water, and finally vulcanizing the dough.

4. The method of manufacturing gas expanded rubber which comprises subjecting the dough to externally applied neutral gas under pressure in an autoclave to gas impregnate the dough and heating the dough to effect partial vulcanization thereof, reducing the gaseous pressure, injecting cold water into the autoclave against the reduced gas pressure to cool the heated gassed dough by direct contact with said gassed dough, releasing the gaseous pressure, and finally vulcanizing the dough.

5. The method of manufacturing gas expanded rubber which comprises subjecting the dough to a neutral gas under pressure in an autoclave and heating the dough to effect partial vulcanization thereof, reducing the gaseous pressure, injecting cold water into the autoclave against the reduced gas pressure to partially cool the heated gassed dough by direct contact therewith, and then circulating cold water through the chamber to directly and completely cool the dough, releasing the gaseous pressure, and finally vulcanizing the dough.

6. The method of manufacturing gas expanded rubber which comprises placing the dough in a container, subjecting the dough to a neutral gas under pressure in an autoclave and heating the dough to effect partial vulcanization thereof, releasing the gaseous pressure, plunging the dough cylinder into cold water to rapidly cool the dough by direct contact with said cold water, and finally vulcanizing the dough.

7. The method of gassing rubber dough in an autoclave which comprises introducing condensed gas into an auxiliary chamber, vaporizing the condensed gas to build up a high gaseous pressure, feeding the gas into the autoclave, and subjecting the dough to the vaporized condensed gas at high pressure to gas impregnate the dough throughout its mass.

8. The method of gassing rubber dough in an autoclave which comprises pouring liquid gas into an auxiliary chamber, heating the chamber to vaporize the liquid gas and build up a high gaseous pressure, feeding the gas into the autoclave, and subjecting the dough to the vaporized condensed gas at high pressure to impregnate the dough throughout its mass.

9. The method of gassing rubber dough in an autoclave which comprises pouring liquid carbon dioxide into an auxiliary chamber, heating the liquid gas to vaporize the liquid gas and build up a high gaseous pressure, feeding the gas into the autoclave, and subjecting the dough to the vaporized condensed gas at high pressure to impregnate the dough throughout its mass.

10. The method of gassing rubber to produce gas expanded rubber which comprises disposing within a gassing chamber rubber in sheet form about a porous hollow supporting medium to form a multiple layer rubber cylinder, maintaining the different layers of rubber separated one from the other by means of corrugated sheeting, placing condensed gas in liquid form in an auxiliary chamber, heating the liquid gas to cause it to assume gaseous form and build up a relatively high gas pressure, feeding said gas under pressure into the gassing chamber and subjecting the multiple layer rubber cylinder to this gas under pressure to gas impregnate the rubber homogeneously throughout its mass.

11. The method of gassing rubber in an autoclave which comprises introducing a condensed gas into an auxiliary chamber, vaporizing the condensed gas to build up a gaseous pressure sufficiently high to effect penetration of the rubber in the autoclave by the gas, feeding the gas into the autoclave, and subjecting the rubber in the autoclave to the vaporized condensed gas to thoroughly gas impregnate the rubber.

12. In the method of manufacturing closed cell gas expanded rubber, the steps which comprise placing rubber in an autoclave, introducing a condensed gas into an auxiliary chamber, vaporizing the condensed gas to build up a gaseous pressure sufficiently high to effect penetration of the rubber in the autoclave by the gas, feeding the gas into the autoclave, subjecting the rubber in the autoclave to the vaporized condensed gas to thoroughly gas impregnate the rubber, and maintaining the gas in the rubber to form a closed cell rubber.

13. The method of gassing rubber in an autoclave which comprises introducing a gas in solid form into an auxiliary chamber, vaporizing the solid gas to build up a gaseous pressure sufficiently high to effect penetration of the rubber in the autoclave by the gas, feeding the gas into the autoclave, and subjecting the rubber in the autoclave to the vaporized solid gas to thoroughly gas impregnate the rubber.

14. The method of manufacturing gas expanded rubber which comprises subjecting rubber to heat to partially vulcanize the rubber, gassing the rubber while it is still hot, cooling the heated rubber by directly contacting the rubber with cold water, and subsequently heating the rubber to complete the vulcanization.

15. The method of manufacturing closed cell gas expanded rubber which comprises subjecting rubber to heat to partially vulcanize the rubber, gassing the rubber while it is still hot, cooling the heated rubber by directly contacting the rubber with cold water, and subsequently heating the rubber to complete the vulcanization.

16. The method of manufacturing closed cell gas expanded rubber which comprises subjecting rubber to heat to partially vulcanize the rubber, gassing the rubber while it is still hot, cooling the heated rubber by directly contacting the rubber with a cold inert liquid, and subsequently heating the rubber to complete the vulcanization.

DUDLEY ROBERTS.